(12) United States Patent
Cichon

(10) Patent No.: US 8,276,503 B2
(45) Date of Patent: Oct. 2, 2012

(54) AXIAL PISTON MACHINE

(75) Inventor: Martin Cichon, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 827 days.

(21) Appl. No.: 12/227,986

(22) PCT Filed: Jul. 9, 2007

(86) PCT No.: PCT/EP2007/056968
§ 371 (c)(1),
(2), (4) Date: Apr. 28, 2009

(87) PCT Pub. No.: WO2008/017557
PCT Pub. Date: Feb. 14, 2008

(65) Prior Publication Data
US 2009/0199706 A1    Aug. 13, 2009

(30) Foreign Application Priority Data
Aug. 11, 2006  (DE) .................... 10 2006 037 690

(51) Int. Cl.
*F01B 13/04*   (2006.01)
*F01B 31/10*   (2006.01)
*F16C 32/06*   (2006.01)

(52) U.S. Cl. .................... 92/57; 92/71; 92/156; 384/121
(58) Field of Classification Search .................... 92/12.2, 92/57, 71, 153, 154, 156; 91/499, 504, 505; 417/222.2, 267; 384/100, 121, 122
See application file for complete search history.

(56) References Cited

U.S. PATENT DOCUMENTS

| 3,554,095 A | 1/1971 | Bobst | |
| 2003/0123765 A1* | 7/2003 | Hirano et al. | 384/118 |
| 2005/0172798 A1 | 8/2005 | Kadlicko | |

FOREIGN PATENT DOCUMENTS

| EP | 0 608 144 | 7/1994 |
| EP | 1 298 335 | 4/2003 |

* cited by examiner

*Primary Examiner* — Michael Leslie
(74) *Attorney, Agent, or Firm* — Kenyon & Kenyon LLP

(57) ABSTRACT

An axial piston machine includes a housing and pistons situated in cylinder bores of a rotatable cylinder member, which pistons are supported on a pivoting cradle, the pivoting cradle being supported via at least one pivoting bearing having a bearing gap that has fluid acting on it. The axial piston machine further includes a control and/or regulating device is provided for the control and/or regulation of the fluid pressure in the bearing gap.

14 Claims, 3 Drawing Sheets

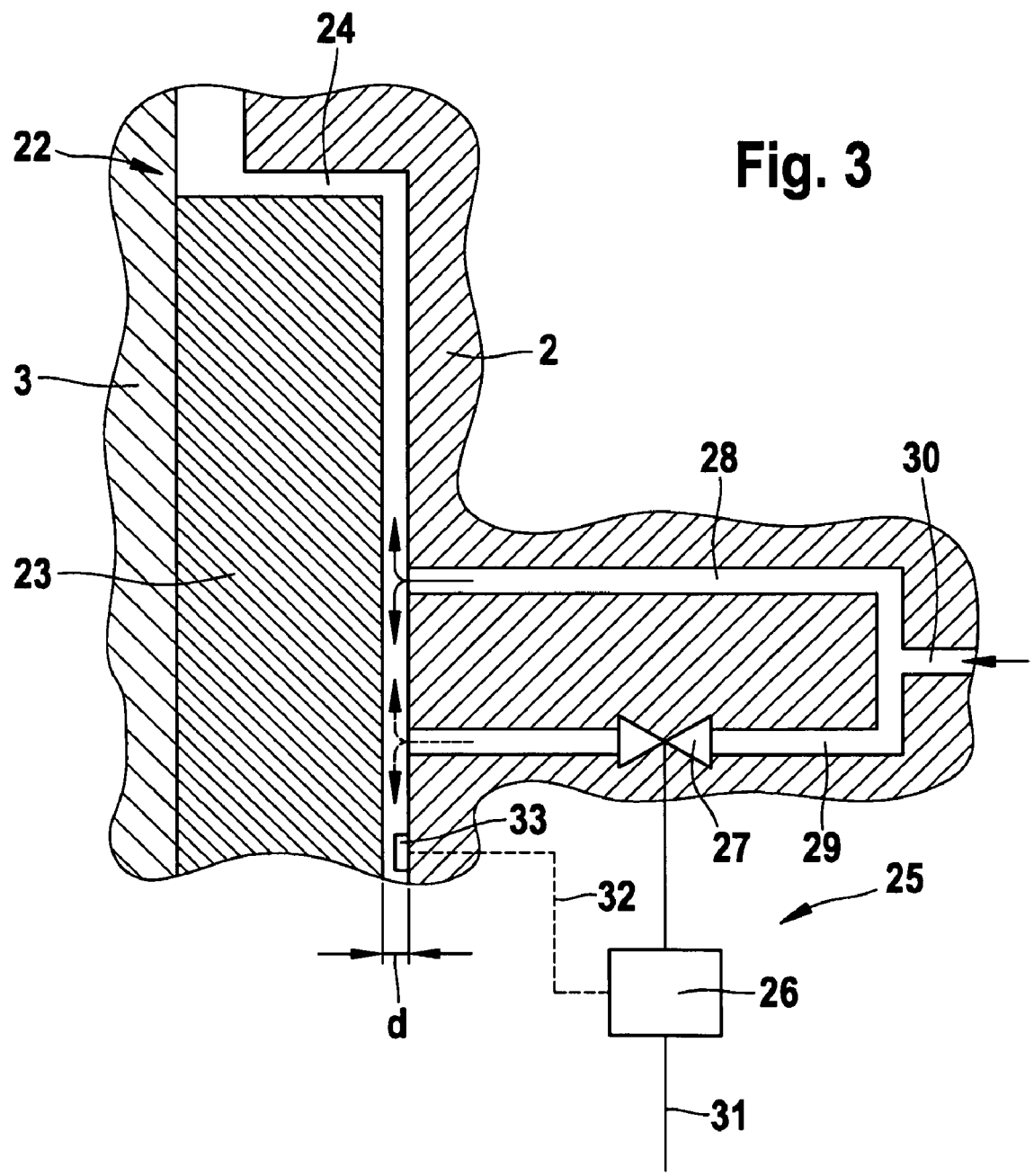

AXIAL PISTON MACHINE

This application claims priority to international patent application no. PCT/EP2007/056968 filed on Jul. 9, 2007, which claims priority to German patent application no. 10 2006 037 690.0 filed on Aug. 11, 2006.

BACKGROUND OF THE INVENTION

1. Field of the Invention

The present invention relates to an axial piston machine having a plurality of pistons.

2. Description of Related Art

Axial piston machines are hydrostatic pumps or motors that are based on the positive displacement principle. Known axial piston machines have a plurality of pistons kinematically guided in cylindrical bores in a rotating cylinder block, as well as on a pivotable pivoting cradle (swash plate). The pistons are acted upon, at the fluid end of the axial piston machine, by the fluid pressure, the forces created thereby being supported at the opposite piston end on the pivoting cradle, in particular, via in each case at least one sliding block. The force component acting in the direction of the normal to the sliding surface of the pivoting cradle is supported via at least one pivoting bearing, either directly in the housing or indirectly at the housing via a separate bearing shell. Known axial piston machines have suitable actuators for steplessly pivoting the pivoting cradle in the angle it makes with the rotational axis of the cylinder member. The kinematic piston stroke is set via the angle of inclination of the pivoting cradle.

One advantage of known axial piston machines is based on the rapid setting and changing of the fluid flow rate at constant rotational speed. The pivoting bearings used for supporting the pivoting cradle in the housing are frequently developed as hydrostatically supported sliding bearings, which means that the bearing gap has a fluid under pressure applied to it, whereby the pivoting cradle is lifted off from the housing, or rather from the bearing shell, which, in turn, makes possible a rapid, low-resistance pivoting angle adjustment. The fluid exiting from the pivoting cradle bearing is resupplied to a fluid tank, as so-called leakage fluid. In the constructive design of known axial piston machines, care is taken, on the one hand, that the lubricating film (fluid) is sufficiently thick inside the bearing gap, so as to separate the pivoting cradle from the bearing shell and the housing. On the other hand, the leakage flow should turn out to be as low as possible, and the pressure setting pulsation should be kept as low as possible, which is crucial for designing the machine for low noise development. The demands for a sufficiently thick lubricating film and a low leakage flow as well as low pressure setting pulsation are diametrically opposed.

BRIEF SUMMARY OF THE INVENTION

An object of the present invention is providing an axial piston machine having a pivoting cradle whose bearing arrangement is optimized with regard to leakage flow, pressure setting pulsation and the thickness of its lubricating film.

The present invention provides a control and/or regulating device for controlling and or regulating the fluid pressure in the bearing gap, that is, for regulating and/or controlling the lubricating film pressure. The control and/or regulating device may basically be situated at any place in the axial piston machine. For most application cases it is sufficient to implement just one control system. The fluid pressure, and with that, the lubricating film thickness, is able to be adapted to the operating state of the axial piston machine by the control and/or regulating device. The fluid volume flow in the bearing gap adjusts itself in proportion to the fluid pressure. Consequently, the magnitude of the leakage flow is able to be influenced via the control system and/or the regulating system. If a low fluid pressure is set, this reduces the lubricating film thickness, the leakage flow and the pressure setting pulsation. If the fluid pressure is increased, however, the lubricating film thickness and the leakage flow increase, and so does the pressure setting pulsation. The control and/or regulation may basically be carried out by hydraulic, electrical and/or mechanical means. Based on the present invention, it is possible for the first time to vary the lubricating film parameters as a function of the operating state.

In a refinement of the present invention, it is advantageously provided that the lubricating film-forming fluid, whose pressure and volume flow is able to be adjusted via the control and/or regulating device, is the conveying fluid conveyed by, or driving the axial piston machine. This makes it possible to omit an additional fluid circuit.

In refinement of the present invention, it is advantageously provided that the control and/or regulating device sets the fluid pressure low during stationary operation, that is, at a constant pivoting angle. For this reason, the axial piston machine works at low leakage, that is, having a high volumetric efficiency and at low noise development (low pressure setting pulsation). The fluid pressure in the bearing gap is increased only for a resetting process, in order to make possible as low-resistance a bearing rotation motion as possible. By doing this, the volumetric conveying efficiency and the noise development deteriorate, but only for the time span of the adjusting process in favor of a lower bearing resistance. At the end of the adjusting movement, the fluid pressure, and with that, the fluid volume flow are reduced again, whereby, in turn, the leakage fluid flow and the noise development decrease. Consequently, the leakage fluid flow and the noise development are at an optimum over the greatest part of the operating time, that is, lower than in known pumps, without having a control and/or regulating device for the fluid pressure in the bearing gap.

In order to make possible a pivoting cradle resetting that is as low in resistance as possible, it is provided in one refinement of the present invention that the fluid pressure is not increased only directly with the beginning of the pivoting cradle resetting, but already shortly before. To do this, the fluid pressure, especially the maximum fluid pressure required for this, is already reached before the adjusting movement begins. In particular, the fluid pressure is increased by the control and/or regulating device less than 5 sec., preferably less than 2 sec., and preferred, less than 1 sec. before the beginning of the adjusting movement. If the control and/or regulating device receives an adjusting signal, it acts on the fluid pressure and increases it in a directly controlling and/or regulating manner.

To implement a regulating unit, at least one electronics unit is provided that is connected to at least one pressure sensor and/or one volume flow sensor. This sensor measures the pressure and the volume flow inside the bearing gap or in a supply line to the bearing gap. The electronics unit regulates the measured actual pressure and actual volume flow to a specified setpoint pressure and setpoint volume flow.

The control and/or regulating device preferably includes a fluid supply line having at least one valve, via which the cross section of the supply line is made variable. If the pivoting cradle is to be pivoted, the supply line cross section is increased by the control and/or regulating device, so that the fluid pressure rises in the bearing gap, whereby the bearing gap becomes larger.

Alternatively to that, it is possible for at least two supply lines to open out into the bearing gap, at least one of the supply lines being able to be cut off, using a valve and/or the cross section of at least one of the supply lines being modifiable using a valve. Preferably the cross section of at least one of the supply lines is not modifiable. The bearing gap is steadily provided with fluid via this supply line. During the adjusting movement, an additional supply line is enabled or its cross section is enlarged.

In order to use the space in the axial piston machine in optimal fashion, according to one refinement of the present invention, it is advantageously provided that at least one of the supply lines, preferably all the supply lines, be guided through the pivoting cradle. In this context it is of advantage if the supply lines are connected to a hydraulic actuator for adjusting the pivoting cradle, via which the supply lines are fed with conveying fluid. At least one supply line might additionally or alternatively be guided through the housing.

For the durable reduction in the fluid pressure, it is advantageous if at least one supply line to the bearing gap has a throttle section or a throttle for reducing the volume flow and thus the leakage flow as well as the pressure setting pulsation.

BRIEF DESCRIPTION OF SEVERAL VIEWS OF THE DRAWING

FIG. 3 shows an example embodiment of a detail from FIG. 1 and FIG. 2, showing an example control and/or regulating device.

DETAILED DESCRIPTION OF THE INVENTION

Figure 1:
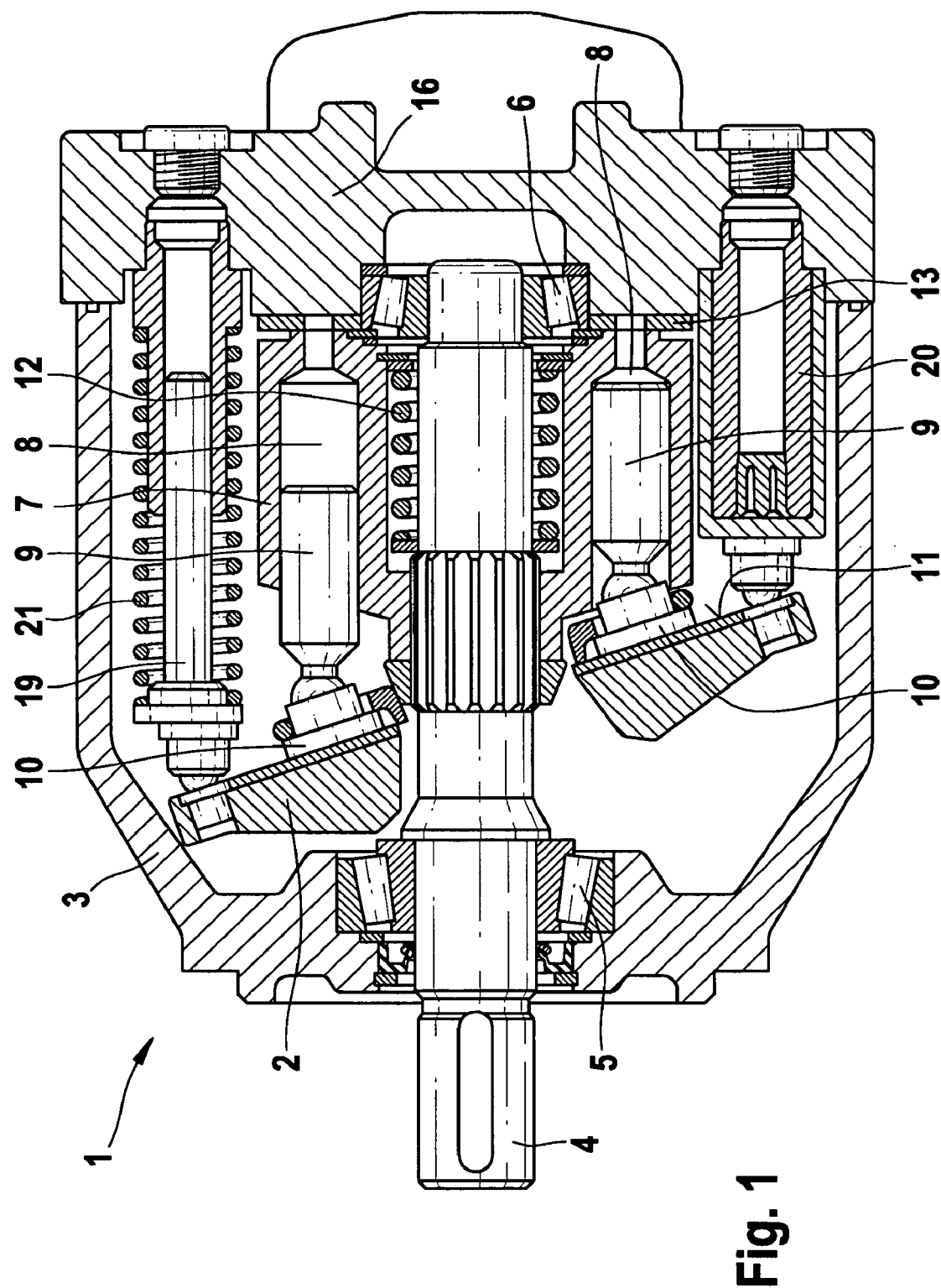
FIG. 1 show a schematic, sectioned representation of an axial piston machine having a pivoting cradle.

In the figures, the same components and components having the same function are designated by the same reference numerals.

The axial piston machine 1 shown is provided with a pivoting cradle 2, which is situated in a pivotable manner inside a housing 3. Pivoting cradle 2 is steplessly adjustable between the inclined position shown in FIG. 1 and the level position shown in FIG. 2.

Inside housing 3, a shaft 4 is rotatably supported with the aid of two roller bearings 5, 6 that are at an axial distance to each other. Shaft 4 is connected in a torsionally fixed manner to a cylinder member 7, movable pistons 9 being situated inside cylinder bores 8, that are distributed around the circumference of cylinder member 7, in an axial direction parallel to shaft 4. Pistons 9 rotate together with shaft 4 and cylinder member 7 in the circumferential direction, and in doing so, they are supported, using sliding blocks 10, on a sliding surface 11 of pivoting cradle 2.

With the aid of a helical compression spring 12, cylinder member 7 is spring-loaded against a control plate 13, in which a suction kidney 14 and a pressure kidney 15 are inserted. Control plate 13 lies, with what is its right side in the drawing plane, against a connecting plate 16, in such a way that the suction kidney 14 is located at a suction connection 17, and the pressure kidney 15 is located at a pressure connection 18. Because of the rotation of cylinder member 7 and the cylinder axis that is not shown in the drawing, and because of the kinematic guidance of piston 9 in cylinder bores 8 and at pivoting cradle 2, pistons 9 execute periodic motions in the axial direction parallel to shaft 4, in the direction of motion away from control plate 13, the fluid being aspirated by suction kidney 14, and the fluid being conveyed in the opposite direction of motion of pistons 9 into the pressure kidney 15.

Figure 2:
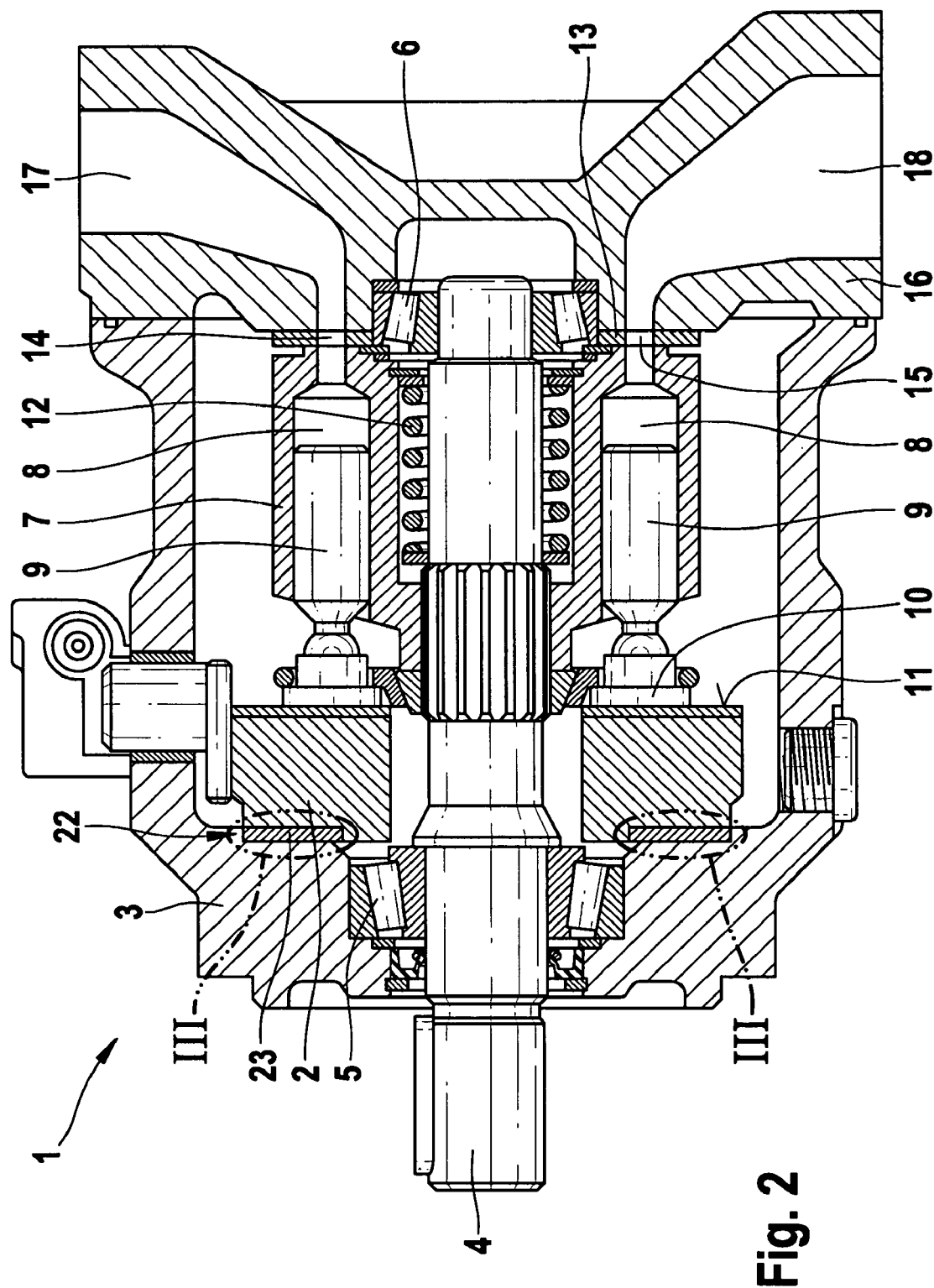
FIG. 2 shows a view of FIG. 1 rotated by 90°, with a pivoting cradle that is, however, not inclined.

In the illustration according to FIG. 1, pivoting cradle 2 is shown in a slanted position, whereas pivoting cradle 2 in FIG. 2 occupies a non-inclined position, i.e. arranged orthogonally to shaft 4. If shaft 4 is set in rotation in the latter position of pivoting cradle 2, pistons 9 do not move axially, but only in the circumferential direction, and no conveying of fluid takes place; however, pistons 9, when they pass over suction kidney 14 and pressure kidney 15, alternately have suction pressure and conveying pressure applied to them.

Two piston-cylinder units 19, 20 are provided for the pivoting of pivoting cradle 2, which are provided with conveying fluid. Piston-cylinder unit 19, in this instance, having the lesser cross section is not controllable, which means that it always has maximum conveying pressure acting upon it. Piston-cylinder unit 19 includes a helical compression spring 21 which ensures that pivoting cradle 2 is inclined even at low overpressure or no overpressure at all in pressure connection 18 and/or in the cylinder of the piston-cylinder unit 19. The control of the adjusting movement takes place via second piston-cylinder unit 20, which has a greater diameter than first piston-cylinder unit 19. The adjustment of pivoting cradle 2 possibly takes place using piston-cylinder unit 20 counter to the pressure force exerted on pivoting cradle 2.

In order to make possible a adjusting movement of pivoting cradle 2 that is as low in resistance as possible, within housing 3, for instance, from the position shown in FIG. 2 to the position shown in FIG. 1, pivoting cradle 2 is supported in housing 3 via a pivoting bearing 22 that is developed as a sliding bearing. For this purpose, a bearing shell 23 is positioned fixedly in housing 3. Between bearing shell 23 and pivoting cradle 2, a bearing gap 24 (see FIG. 3) is provided, through which conveying fluid is steadily pumped. Providing a bearing shell 23 is optional. The bearing gap may, for example, also be provided directly between pivoting cradle and housing, or between two opposite bearing shells, in the latter case one of the bearing shells being connected torsionally fixed to the pivoting cradle. The leakage fluid flow flowing out of bearing gap 24 is supplied to a conveying fluid tank that is not shown. Because of the conveying fluid that flows through bearing gap 24 and is under pressure, the pivoting bearing is supported hydrostatically. The seating of pivoting cradle 2 on bearing shell 23, and thus a pressing upon the bearing, is avoided advantageously.

According to the present invention, a control and/or regulating device 25 is provided. In the present exemplary embodiment, this includes an electronics unit 26, that is, a logic unit. This acts adjustingly on a valve 27, developed in this exemplary embodiment as a cutoff valve, which is situated inside one of two parallel supply lines 28, 29 for conveying fluid to bearing gap 24. Both supply lines 28, 29 are provided with conveying fluid via a common supply line 30. Supply lines 28, 29 as well as supply line 30 are situated inside pivoting cradle 2, and are supplied with conveying fluid from piston-cylinder unit 19 and/or pressure connection 18. In order to do this, appropriate supply lines and supply bores are provided inside piston-cylinder unit 19 and/or within housing 3.

The cross section of supply line 28 is not variable, so that through it a durable supply of bearing gap 24 with fluid under pressure takes place. During an adjusting movement of pivoting cradle 2 using piston-cylinder units 19, 20, or rather, shortly before such an adjusting movement, valve 27 is opened by the electronics unit when it receives an appropriate command via a signal line 31, whereby the fluid pressure rises inside bearing gap 24, and whereby, in turn, the lubricating film thickness, and thus thickness d of bearing gap 24 increases. Corrosion and/or mixed friction and/or dry friction of bearing 22, and wear that goes along with these during the adjusting movement, is consequently avoided with advantage.

Alternatively to this, valve 27 is not developed as a shutoff valve but as a cross-sectional modification valve. Also alternatively, one may do without supply line 28, in which case one should ensure that steadily sufficient fluid pressure is present inside bearing gap 24, to prevent the seating of pivoting cradle 2 on bearing shell 23. If necessary, in addition to supply lines 28, 29, further supply lines may be provided, which are in part not variable in cross section and are in part furnished with an appropriate shutoff valve or cross-sectional modification valve.

In FIG. 3, electronics unit and logic unit 26 is connected via an optional signal line 32, that is shown by a dashed line, to an optional pressure sensor 33, and this supplies electronics unit 26 with an actual pressure variable. In this case, the device according to FIG. 3 is a regulating device. In the case of a control device, exclusively, one may do without sensor 33 and signal line 32.

What is claimed is:

1. An axial piston machine, comprising:
   a housing;
   a plurality of pistons situated in corresponding cylinder bores of a rotatable cylinder body;
   a pivoting cradle supporting the pistons;
   at least one pivoting bearing supporting the pivoting cradle, wherein the at least one pivoting bearing has a bearing gap that varies in size as a slanted position of the pivoting cradle changes and that has fluid acting on it; and
   a control device configured to adjust a fluid pressure in the bearing gap based on an actual or anticipated change in the slanted position of the pivoting cradle.

2. The axial piston machine as recited in claim 1, wherein the fluid is a conveying fluid.

3. The axial piston machine as recited in claim 2, wherein the control device is configured to increase the fluid pressure for adjustment of a position of the pivoting cradle.

4. The axial piston machine as recited in claim 3, wherein the control device is configured to increase the fluid pressure before the beginning of adjustment movement of the pivoting cradle.

5. The axial piston machine as recited in claim 3, further comprising:
   at least one pressure sensor communicatively connected to an electronics unit of the control device, wherein the pressure sensor is configured to measure the fluid pressure, and wherein the electronics unit is configured to regulate the fluid pressure as a function of the measured fluid pressure.

6. The axial piston machine as recited in claim 3, wherein the bearing gap is supplied with fluid via at least one supply line having a cross section configured to be variable by at least one valve.

7. The axial piston machine as recited in claim 3, wherein the bearing gap is supplied with fluid via at least two supply lines, wherein at least one of the at least two supply lines is at least one of: a) configured to be shut off by a valve; and b) configured to have a cross section which is variable by a valve.

8. The axial piston machine as recited in claim 7, wherein a cross section of the other of the at least two supply lines is fixed.

9. The axial piston machine as recited in claim 7, wherein the at least two supply lines are routed through the pivoting cradle.

10. The axial piston machine as recited in claim 7, wherein the value includes a throttling capability for reducing a volume flow of the fluid.

11. An axial piston machine, comprising:
    a housing;
    a plurality of pistons situated in corresponding cylinder bores of a rotatable cylinder body;
    a pivoting cradle supporting the pistons;
    at least one pivoting bearing supporting the pivoting cradle, wherein the at least one pivoting bearing has a bearing gap that has a conveying fluid acting on it supplied via at least two supply lines, at least one of the at least two supply lines is at least one of: a) configured to be shut off by a valve; and b) configured to have a cross section which is variable by a valve; and
    a control device configured to control the fluid pressure in the bearing gap and increase the fluid pressure for adjustment of a position of the pivoting cradle.

12. The axial piston machine as recited in claim 11, wherein a cross section of the other of the at least two supply lines is fixed.

13. The axial piston machine as recited in claim 11, wherein the at least two supply lines are routed through the pivoting cradle.

14. The axial piston machine as recited in claim 11, wherein the value includes a throttling capability for reducing a volume flow of the fluid.

* * * * *